Figure 1:
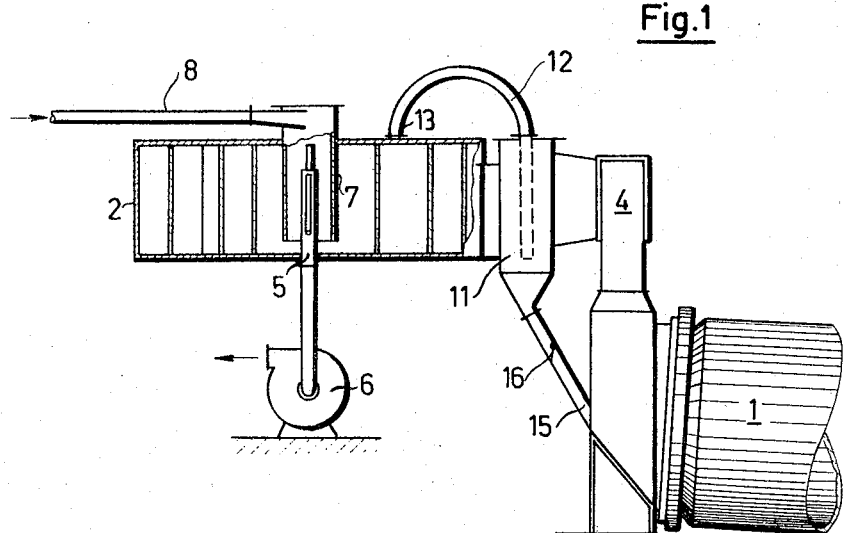

Feb. 28, 1967   W. ISLER   3,305,940
HEAT EXCHANGE BETWEEN GRANULAR MATERIAL AND GAS
Filed Sept. 14, 1964   3 Sheets-Sheet 1

INVENTOR.
Walter Isler
BY
Dodge and Sons
ATTORNEYS

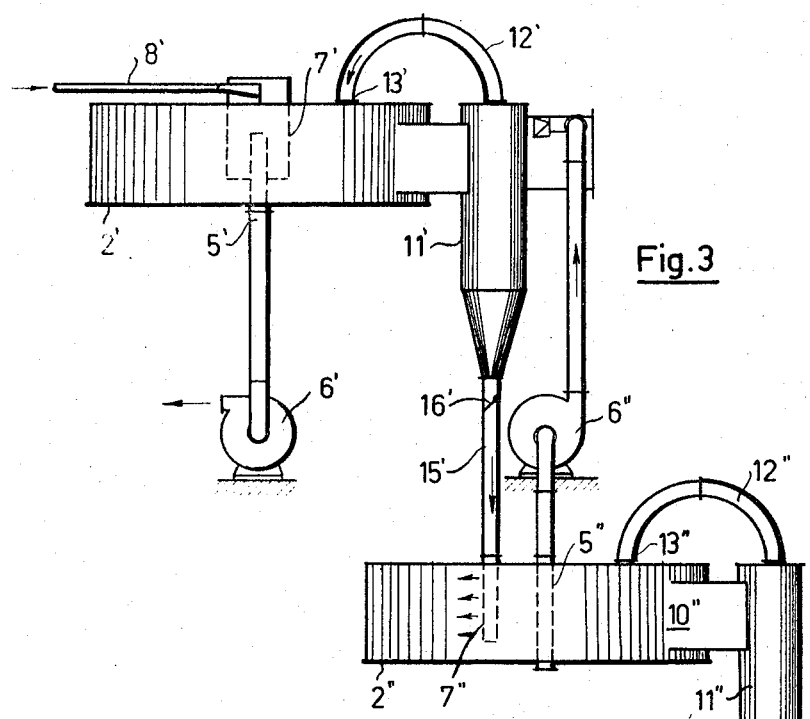
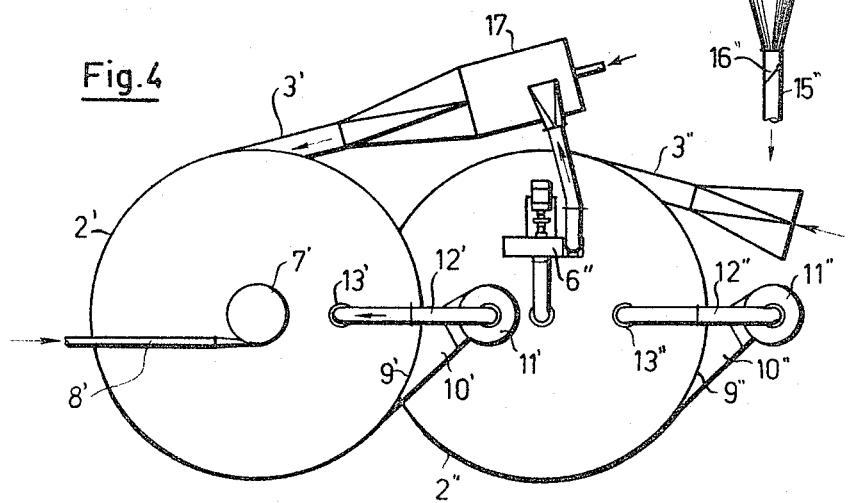

Feb. 28, 1967 W. ISLER 3,305,940
HEAT EXCHANGE BETWEEN GRANULAR MATERIAL AND GAS
Filed Sept. 14, 1964 3 Sheets-Sheet 3

INVENTOR.
Walter Isler
BY
Dodge and Sons
ATTORNEYS

United States Patent Office 3,305,940
Patented Feb. 28, 1967

3,305,940
HEAT EXCHANGE BETWEEN GRANULAR MATERIAL AND GAS
Walter Isler, Tannengut 6, Aarau, Switzerland
Filed Sept. 14, 1964, Ser. No. 396,159
Claims priority, application Switzerland, Oct. 14, 1963, 12,560/63; July 11, 1964, 9,114/64
7 Claims. (Cl. 34—57)

This invention relates to a process for heat exchange between a finely granular material and a gas stream, more particularly for preheating, calcining and burning crude cement powder by waste kiln gases.

In the production of cement clinker, it is known to use rotary kilns followed by preheating cyclone stages. In these cyclone stages of which usually about four are provided, the finely granular material, for example raw meal is preheated with partial calcination by kiln waste gases up to a temperature of about 850° C., the kiln gases being cooled to about 350° C.

A relatively large quantity of heat is lost with the waste gases, unless they can be utilised for other purposes, for example for the drying of raw meal. Such combination of two different processes, however, involves considerable complications for the works. A disturbance in one process will undoubtedly also cause a disturbance in the other process, and in certain circumstances, this can be countered only after some hours, with corresponding expenditure. Furthermore, the raw meal mill as a rule is not in 24-hour use like the kiln, and for this reason, the waste gas conditions for the filter are varied at least twice daily. Coupling together of the said two processes will have a disadvantageous effect with regard to automation or will even make the latter impossible.

A marked improvement in heat transfer and hence further cooling of the kiln waste gases in the system of series-connected cyclone stages could be obtained only by considerable increase in the number of stages. Such an increase in size of the plant, however, would be uneconomical both constructionally and also with regard to power consumption.

In contrast thereto, an improvement is obtained with the process according to the invention. According to the invention, in a process of the hereinbefore described kind, a flow motion in the form of a vortex sink is imparted to the gas, and the granular material to be brought into heat-exchange with the gas is admixed with the gas in the vicinity of the vortex core so that, in the rotary movement with the gas, it moves outwardly opposite to the inwardly directed radial component of the gas velocity with heat-exchange with the gas, and thereupon can be collected again.

The result of this step is that, for example, the granular material to be heated by a hot gas stream, is gradually moved into the hotter part of the gas stream, and can be finally collected at the hottest place of the gas stream. Contrary to the prior mode of operation with series-connected cyclone stages, in which each time heat transfer occurs in parallel flow, pure counterflow is realised with the step according to the invention. Thus, not only is heat transfer improved, but there is also no necessity for repeatedly separating the material to be heated from the gas stream. There is thus a saving in constructional expenditure and in power consumption.

The invention furthermore relates to a heat-exchanger for carrying out this process. This heat-exchanger according to the invention has an at least approximately circularly cylindrical container, and this container is provided with at least one admission duct opening into the container at its outer periphery and designed for the introduction of the gas into the container with rotary motion about the container axis and with a central discharge duct for the gas, and there is arranged in the interior of the container in the vicinity of the discharge duct, a feed device for the granular material to be brought into heat exchange with the gas, and the container possesses externally at least one outlet for collecting the material arriving at the exterior.

Figure 5:
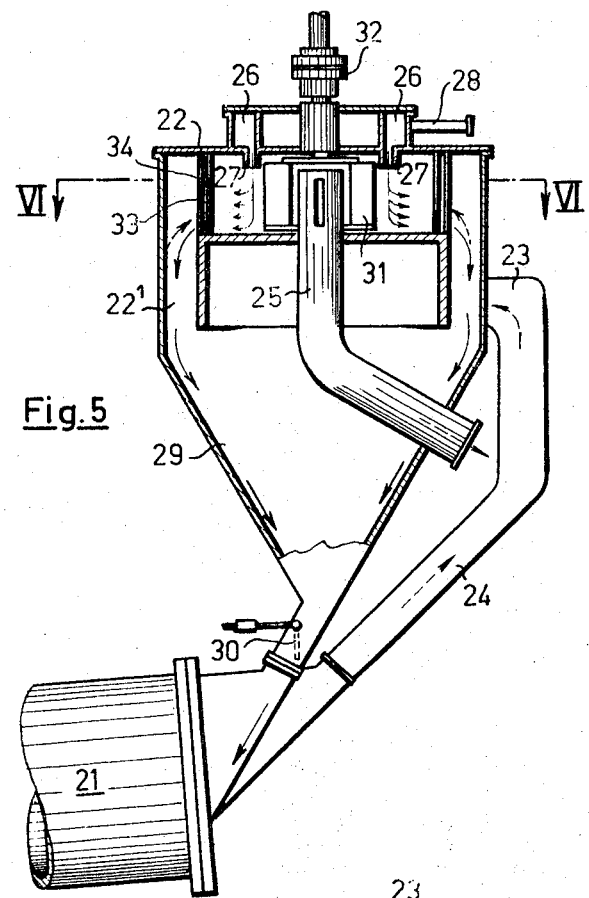
Figure 6:
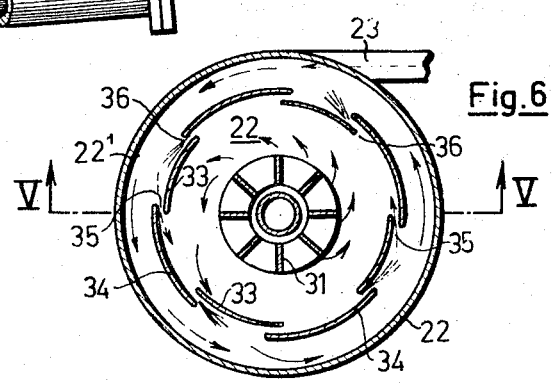

Constructional examples of the heat-exchanger according to the invention are represented in simplified manner in the drawings, and the process according to the invention will also be explained with reference thereto. In these drawings FIG. 1 shows a vertical section through a constructional example on the line I—I of FIG. 2, FIG. 2 shows this constructional example seen from above, FIG. 3 is a side view of another embodiment, FIG. 4 shows the same embodiment seen from above, FIG. 5 is a vertical section on the line V—V of FIG. 6 through another embodiment, and FIG. 6 is a horizontal section on the line VI—VI of FIG. 5.

Figure 2:
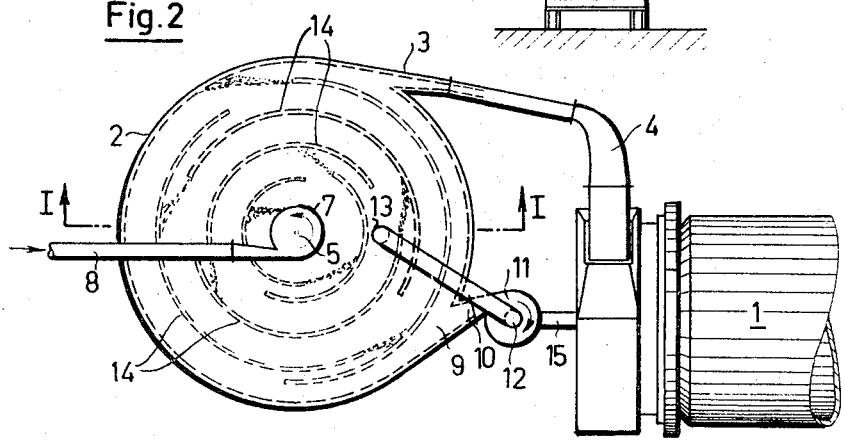

The heat-exchanger shown in FIGS. 1 and 2 is intended for the preheating, calcining and burning of raw cement meal by the waste gases of a rotary cement kiln 1. It has a circularly cylindrical container 2. The latter is provided with a gas admission duct 3 opening tangentially on the outer periphery, to which the waste kiln gases as heating gas are supplied through a conduit 4 from the kiln 1, and with a central discharge duct 5 for the gas. The gas admission duct 3 is therefore designed to introduce the gas into the container 2 with a rotary motion about the container axis. The gas is exhausted from the discharge duct 5 by a blower 6.

In the interior of the container 2 in the vicinity of the discharge duct 5 is a feed device 7 for the raw cement meal, that is to say, for a finely granular material to be brought into heat exchange with the gas, to which feed device the raw cement meal is fed through a conduit 8. The container 2 has on the outer periphery an outlet 9 for the finely granular material arriving at the exterior, and a collecting duct 10 is connected tangentially to said opening 9. This collecting duct 10 is provided with a cyclone separator 11, whereof the gas outlet is connected by a conduit 12 to another point 13 of the container 2 situated more inwardly than its external periphery.

In the arrangement described, a flow motion in the form of a vortex sink is imparted to the gas entering the container 2 through the admission duct 3, the vortex core being situated in the container axis. By means of the feed device 7, the finely granular material is admixed with the gas in the vicinity of the vortex core before the gas is discharged through duct 5. The material is entrained by the gas, so that with the latter it makes a rotary movement about the container axis. In addition, the feed device 7 is so designed that the finely granular material immediately it leaves the device is given a tangential velocity component in the direction of the rotary movement of the gas.

Now, however, the finely granular material on its rotary motion with the gas will be centrifuged outwardly due to its higher gravity. It thus moves opposite to the inwardly directed radial component of the gas velocity. At the same time, the finely granular material undergoes heat exchange with the gas, being here heated by the gas in pure counterflow. Favourable heat-transfer conditions are therefore provided.

To increase the time of stay of the finely granular material in the heat-exchanger, in the embodiment shown, guide segments 14, extending substantially concentrically of the container axis, are arranged in the flow space of the container 2. These segments in each case intercept part of the outwardly moving finely granular material. The latter is then entrained by the gas along the guide segments 14 and at the end of the guide segments 14 is led in each case into a more outwardly situated part of the gas stream.

Finally, the finely granular material arriving at the outer periphery of the container 2, along with part of the gas admitted to the container 2, is received by the collecting duct 10 to provided with the cyclone 11. The finely granular material is separated in the cyclone 11 and is supplied to the kiln 1 through a conduit 15 with shut-off flap 16, while the part of the gas flowing through the collecting duct 10 is returned to the container 2 by the conduit 12 at the point 13 of the container 2, at which point, during operation, a lower pressure prevails than in the collecting duct 10.

FIGS. 3 and 4 show a heat-exchanger intended for the heat-treatment of a finely granular material, the heat content of the heated material being re-used after the treatment.

In this case, the heat-exchanger has two containers 2' and 2", in construction corresponding substantially to container 2 of FIGS. 1 and 2. Each of these containers is provided respectively with an admission duct 3', 3", and with a central discharge duct 5', 5" for the gas. In the interior of each container, in the vicinity of the discharge duct 5', 5", respectively, there is a feed device 7', 7" for the finely granular material, and each container has on the external periphery an outlet 9', 9" for the finely granular material arriving at the outside.

Combustion gases from a combustion chamber 17 are supplied by the admission duct 3' to the container 2'. As in the container 2 in FIG. 1, a flow motion in the form of a vortex sink is imparted to the gases in said container 2'. The finely granular material to be treated passes through a conduit 8' to the feed device 7'. It reaches the exterior while receiving heat, and with part of the gas passes through the outlet 9' into a collecting duct 10' with cyclone 11'. It is there separated from the gas and passes through a conduit 15' with shut-off flap 16' to the feed device 7" of container 2". The gas leaves the cyclone 11' through a conduit 12' and is returned to the container 2' at a point 13'.

Cold air from the atmosphere is supplied to the container 2" through the conduit 3". This cold air is the container 2" also has imparted to it a flow motion in the form of a vortex sink. The hot, finely granular material introduced through the feed device 7" reaches the exterior while being cooled, and passes, with part of the air, through the outlet 9" into a collecting conduit 10" with cyclone 11". The separated finely granular material is discharged through a conduit 15" with flap 16" while the air is returned through a conduit 12" to a point 13" of the container 2".

The waste gases entering the central discharge duct 5' of the container 2' are exhausted by a fan 6' and led into the open air. The air heated in the container 2" by the material to be cooled is, on the contrary, conveyed from the central discharge duct 5" by means of a fan 6" as combustion air into the combustion chamber 17.

In the heat-exchanger apparatus described with reference to FIGS. 3 and 4, a special source of heat is used for the production of the hot gases, instead of the waste gases of the kiln of FIGS. 1 and 2. The heat-exchanger may also be used, for example, for burning hydraulic line, which must then be ground before burning. The fact that after the heat-treatment in container 2", the heat contained in the material is utilised for preheating the combustion air results in economic operation of the plant.

The heat-exchanger described in FIGS. 3 and 4 could, however, be used for the cold treatment of a finely granular material, in which case a refrigerator would have to be used instead of the combustion chamber 17.

The heat-exchanger according to FIGS. 5 and 6 is intended for example for heating a finely granular material by the waste gases of a furnace 21. It has a circularly cylindrical container 22, arranged with vertical axis and provided externally with a downwardly extending annular duct $22^1$. Opening tangentially into this annular duct $22^1$ is an admission duct 23, to which the furnace gases as heating gas are supplied through a conduit 24 from the furnace 21. The container 22 is furthermore provided with a central discharge duct 25 for the gas. The admission duct 23 is thus designed so that it introduces the gas into the container 22 through the annular duct $22^1$ with a rotary motion about the container axis. The gas is exhausted from the discharge duct 25 by a blower, not shown.

In the interior of the container 22 in the vicinity of the discharge duct 25 is a feed device, connected to an annular chamber 26, for the granular material to be heated by the heating gas, said feed device comprising an annular nozzle 27, opening from above into and coaxial with the container 22. The material is blown into the annular chamber 26 through a conduit 28.

The annular duct $22^1$ is open downwardly and thus forms an outlet for the granular material, separated in the container 22 by the rotary motion of the gas, and arriving at the outside against the inwardly directed gas flow. A hopper 29, with shut-off flap 30, adjoins the outlet and collects the descending material.

The gas entering with rotary motion the annular duct $22^1$ from the admission duct 23, ascends in said annular duct $22^1$ against the descending heated granular material, and then in the container 22, while maintaining the rotary motion, flows inwardly to arrive at the central discharge duct 25. Mounted between the feed device 27 for the finely granular material and the discharge duct 25 for the gas is a vane wheel 31, which is concentric with said discharge duct and is connected by a coupling 32 to a driving motor, not shown. In operation, the vane wheel 31 is driven in the same direction of rotation in which the gas, coming from the admission duct 23, rotates about the container axis. A uniform rotary movement of the gas is thus maintained over the full height of the container, and material, entering the container 22 from the feed device 27, is prevented from accumulating in the inlet region or even entering the discharge duct 25.

Radially outside the feed device 27 in the container 22 on two concentric circles are mounted individual guide segments 33 and 34, leaving openings between each other and overlapping each other. The flow of the gases is indicated by solid-line arrows and that of the granular material by broken-line arrows. The gaps 35 and 36 formed at the overlap places serve for the passage of inwardly flowing gas or outwardly projected material.

Two or more heat-exchangers of the kind described may also be used in series connection for the stepwise heat transfer from gas to granular material or conversely. The sets of apparatus may be arranged one above the other, in which case, the hopper 29 would have to be of such a form as to lead the collected granular material into the annular space of the underlying apparatus.

What is claimed is:

1. A heat exchanger for the heat exchange between a granular material and a gas comprising at least one substantially cylindrical container; at least one admission duct for said gas opening into said container at its outer periphery so as to introduce the gas into said container with rotary motion about the cylinder axis; a gas discharge duct issuing from the center of said container; means for circulating said gas from said gas admission duct through said container to said gas discharge duct; a feed device for the granular material to be brought into heat exchange with the gas, arranged radially inward of said gas admission duct so as to admix said material with the gas before the latter is discharged through the gas discharge duct; circumferentially extending guide segments arranged within said container between the material feed device and the outer periphery of the container so as to intercept at least part of the outwardly traveling granular material and lead it into part of the flowing gas situated radially further out; and means for collecting the granular material which is centrifuged toward the outer periphery of the container by the rotary motion of the gas.

2. The heat exchanger defined in claim 1 in which the means for collecting the granular material comprise a material discharge duct issuing from the outer periphery of the container and provided with a cyclone separator having a gas outlet pipe leading to a point of the container at which in operation a lower pressure prevails than in said material discharge duct.

3. A heat exchanger for the heat exchange between a granular material and a gas comprising a substantially cylindrical container; at least one admission duct for said gas opening into said container at its outer periphery so as to introduce the gas into said container with a rotary motion about the container axis; a rotatable radially inward flow vane wheel arranged within said container coaxially therewith, an annular flow space for the gas being left between the outer periphery of the vane wheel and the outer periphery of the container; a gas discharge duct issuing from the center of said container; means for circulating the gas from said gas admission duct through said annular space and said vane wheel to said gas discharge duct; a feed device for the granular material to be brought into heat exchange with the gas arranged in said annular space near the outer periphery of said vane wheel; and means for collecting the granular material which is centrifuged toward the outer periphery of the container by the rotary motion of the gas.

4. The combination defined in claim 3 in which the container is arranged with vertical axis and the material feed device comprises an annular nozzle arranged coaxially with the container so as to open from above into said annular space.

5. The combination defined in claim 3 in which the vane wheel is provided with a driving means.

6. The combination defined in claim 3 in which the container has at its outer periphery a downwardly extending annular duct for the discharge of the granular material and in which the gas admission duct opens into said annular duct.

7. The combination defined in claim 3 comprising guide segments arranged in the annular gas flow space radially outside the material feed device on circles concentric with the container axis so as to leave openings between each other; the guide segments on successive circles overlapping each other so as to form gaps for the passage of the gas and the granular material.

References Cited by the Examiner

UNITED STATES PATENTS

| 1,509,915 | 9/1924 | Stebbins | 34—57 |
| 2,659,587 | 11/1953 | Bowen | 263—21 |
| 3,127,250 | 3/1964 | Heinemann | 263—21 X |
| 3,136,536 | 6/1964 | Heinemann | 263—21 |
| 3,146,998 | 9/1964 | Golucke et al. | 263—21 |
| 3,175,686 | 3/1965 | Reith | 34—57 X |

FREDERICK L. MATTESON, JR., *Primary Examiner.*

D. A. TAMBURRO, *Assistant Examiner.*